(12) United States Patent
Gambino et al.

(10) Patent No.: US 7,477,050 B2
(45) Date of Patent: Jan. 13, 2009

(54) MAGNETIC SENSOR HAVING A COIL AROUND A PERMEABLE MAGNETIC CORE

(75) Inventors: Richard Gambino, Stony Brook, NY (US); Jon Longtin, Port Jefferson, NY (US); Sanjay Sampath, Setauket, NY (US); Szymon Tankiewicz, Stony Brook, NY (US)

(73) Assignee: Research Foundation of the State University of New York, Stony Brook, NY (US)

( * ) Notice: Subject to any disclaimer, the term of this patent is extended or adjusted under 35 U.S.C. 154(b) by 891 days.

(21) Appl. No.: 10/491,689

(22) PCT Filed: Aug. 5, 2003

(86) PCT No.: PCT/US03/24503

§ 371 (c)(1),
(2), (4) Date: Apr. 2, 2004

(87) PCT Pub. No.: WO2004/044672

PCT Pub. Date: May 27, 2004

(65) Prior Publication Data

US 2005/0033819 A1 Feb. 10, 2005

(51) Int. Cl.
*G01S 3/02* (2006.01)
*G01R 33/00* (2006.01)

(52) U.S. Cl. .................. 324/76.14; 324/253; 324/260

(58) Field of Classification Search ............ 324/76.41, 324/127, 129, 244, 249, 253, 260, 652
See application file for complete search history.

(56) References Cited

U.S. PATENT DOCUMENTS

| | | | | |
|---|---|---|---|---|
| 3,689,907 A * | 9/1972 | Guajardo | ................... | 340/602 |
| 4,327,416 A * | 4/1982 | Jerrim | ................... | 324/117 H |
| 5,227,798 A * | 7/1993 | Hildebrand | ................... | 342/51 |
| 5,278,442 A | 1/1994 | Prinz et al. | ................... | 257/417 |
| 5,406,829 A * | 4/1995 | Ravel et al. | ................... | 73/24.01 |
| 5,705,399 A * | 1/1998 | Larue | ................... | 436/501 |
| 5,818,340 A | 10/1998 | Yankielun et al. | ................... | 340/602 |
| 5,894,647 A * | 4/1999 | Lakin | ................... | 29/25.35 |
| 6,025,725 A * | 2/2000 | Gershenfeld et al. | ................... | 324/652 |
| 6,111,520 A * | 8/2000 | Allen et al. | ................... | 324/655 |
| 6,113,553 A | 9/2000 | Chubbuck | ................... | 600/561 |
| 6,254,548 B1 | 7/2001 | Ishikawa et al. | ................... | 600/549 |
| 6,278,379 B1 * | 8/2001 | Allen et al. | ................... | 324/655 |
| 6,331,680 B1 * | 12/2001 | Klassen et al. | ................... | 174/261 |
| 6,366,076 B1 * | 4/2002 | Karrer et al. | ................... | 324/127 |
| 6,501,287 B1 * | 12/2002 | Baldwin | ................... | 324/708 |

* cited by examiner

*Primary Examiner*—Timothy J Dole
(74) *Attorney, Agent, or Firm*—F. Chau & Associates, LLC (57) ABSTRACT

A differential wireless sensing device includes a first resonant device impinged on a substrate having a predetermined natural frequency, the first resonant device having a changeable resonant frequency in response to an environmental condition, and a second resonant device impinged on the substrate having a predetermined static resonant frequency.

3 Claims, 8 Drawing Sheets

| FIGURE 3A | FIGURE 3B | FIGURE 3C | FIGURE 3D | FIGURE 3E |
| --- | --- | --- | --- | --- |
| Inductors/ Transformers | Thermistors | Magnetic Sensors | RF Elements | Microheaters |

FIGURE 4A

All Fingers
Written

FIGURE 4B

3 Fingers
Left Unwritten

FIGURE 4C

12 Fingers
Left Unwritten

MAGNETIC SENSOR HAVING A COIL AROUND A PERMEABLE MAGNETIC CORE

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of grant No. N000140010654, awarded by the Department of Defense DARPA.

CROSS-REFERENCE TO RELATED APPLICATIONS

This application is a National Stage Entry of International Application No. PCT/US03/24503, filed Aug. 5, 2003, which claims the benefit of U.S. Provisional Application 60/401, 154, filed Aug. 5, 2002.

BACKGROUND OF THE INVENTION

1. Field of the Invention

The present invention relates to electronic devices, and more particularly to wireless sensors fabricated by thermal spray technology.

2. Discussion of the Prior Art

Sensors are ubiquitous in modern engineering systems. They are used to measure temperature, strain, pressure, humidity, etc., in a vast array of materials. One of the ongoing challenges in many sensor applications, however, is how to extract the signal from the sensor for recording and further processing. This issue is particularly challenging for situations immersed in harsh environments, including, for example, those containing high temperatures, corrosive materials, significant wear situations, significant and/or prolonged vibration, thermal loading, etc. Practical examples of harsh environments include the hot section of a gas turbine or an internal combustion engine, boilers for power and steam generation, power transmission components, etc.

Sensor signal extraction can be considered in two classes, wire-based and wireless. Wire-based sensors represent a large and diverse class of applications in which electrical wires are physically connected to the sensor or sensor system, and a signal is delivered to a point of interest. In many situations, such an approach is adequate. For harsh environments and environments in which the geometry precludes the convenient connection of physical wires, wireless approaches have been developed. Wireless sensors transmit the sensor data using electromagnetic, optical, acoustical, or other means of information transmittal to a suitable receiver. Electromagnetic (EM) wireless sensors represent a significant portion of wireless signal extraction techniques.

Wireless EM sensors, referred to in the following as wireless sensors, can be further classified as active or passive. Active wireless sensor systems modulate an EM signal in response to the sensor output and need some form of power supply in the sensor circuit itself to provide the energy needed to relay the sensor information to a suitable receiver. Such systems suffer from several significant drawbacks: they need either periodic replacement of the energy source, e.g., a battery, or some form of renewable energy source, which can be expensive, adds complexity, and can be unreliable. Further, they almost invariably incorporate silicon-based active electronics, which need additional measures for protection in harsh environments while also providing limits on the temperatures at which the devices can be used. Active wireless systems are typically large and bulky, and thus require additional space, special provisions for sensor, electronic, and power supply attachment, and can be difficult to integrate directly into functional components.

Passive wireless sensors, on the other hand, derive the energy needed for signal transmission from an outside source. Variations of this technique include 1) modulating an externally applied source signal, 2) temporarily storing the externally applied energy in a storage medium, after which it is used to transmit the signal, and 3) converting one form of energy into another. Passive wireless systems that temporarily store energy to power active electronics suffer from the same drawbacks as their active counterparts discussed above.

U.S. Pat. No. 6,254,548 by Ishikawa et al. represents an example of an active wireless sensor that needs no battery. It teachers of a small spherical-shaped wireless temperature transponder utilizing active electronics that are powered by converting an externally applied EM field into electrical energy suitable to drive the encapsulated electronics. The sensor, however, is active, and utilizes silicon-based components.

U.S. Pat. No. 6,113,553 by Chubbuck teaches of a passive wireless sensor to measure intracranial pressure. The sensor element is embedded within the skull of the patient and an external probe is placed on the other side of the skull to record the pressure. A bellows in the sensor deforms according to the imposed pressure and alters the resonance frequency of the circuit, which is recorded by the external probe. While providing a passive sensor system, the probe assembly is bulky, complicated, needs considerable labor and expense to fabricate, and relies on mechanical deformation of the bellows (which can be unreliable and prone to failure), and needs the receiver (the probe) to be placed within a few millimeters of the sensor for accurate readout.

U.S. Pat. No. 5,818,340 by Yanklelun and Flanders discloses a passive wireless sensor system to measure moisture in the roofs of structural buildings. An inductor-capacitor resonant circuit is formed in which the capacitor is formed by two concentric plates with a moisture-sensitive dielectric between said plates. Variations in moisture result in variations in capacitance, which shift the resonant frequency of the circuit. An external antenna provides an RF pulse to an array of such sensors on a rooftop, and then records the resonant frequencies of the sensor systems. Moisture content is detected by a shift in resonant frequency from that of the dry sensors.

U.S. Pat. No. 5,278,442 by Prinz, Weiss, and Siewiorek teaches the use of thermal spray to form electronic packages and smart structures, including strain gauges and thermocouples. The thermal spray method of Prinz is complex, cumbersome, slow, and limited in feature size because it relies on a series of masks to selectively deposit material in a multi-layer fashion.

To employ these technologies, the sensors need to be fabricated in a separate manufacturing step at a specialized facility for such devices, followed by the attachment of the sensor device to the surface or component of interest, typically after the component has been manufactured. For RF-based systems, antennas need to be added, adding additional cost, time, and labor. The addition of the sensing system in many cases degrades the performance of the component, for example, thermocouples that need to be cemented to surfaces for fluid flow can result in flow disturbance and turbulence formation as a result of the added devices.

Electronic manufacturing with feature sizes in the meso-scale regime (e.g., in the range of about 10 to 1000 micrometers) typically needs multi-step processes that include time-consuming photolithographic methodologies. The time needed between iterations is typically measured in terms of weeks. In addition, thick film electronics based on the ceramic multi-chip module technology, including low temperature co-fired ceramic modules (LTCC-M) and high temperature co-fired ceramic modules (HTCC-M) need firing of the screen printed pastes to moderate ~800 C for LTCC-M or high 1400 C for HTCC-M. The high temperature curing process sets-up issues associated with mismatch in thermal expansion between dissimilar materials and can lead to premature debonding. This needs to be accounted for during the processing through careful tailoring of the properties of the layered materials. Current screen printing technology is inherently limited in its fine feature capabilities; the line width being limited to 100 microns or higher.

Therefore, a need exists for a method of fabricating wireless sensors on functional engineering components and pre-existing surfaces.

SUMMARY OF THE INVENTION

According to an embodiment of the present invention, a differential wireless sensing device comprises a first resonant device impinged on a substrate having a predetermined natural frequency, the first resonant device having a changeable resonant frequency in response to an environmental condition and an second resonant device impinged on the substrate having a predetermined static resonant frequency.

The differential device further comprises a frequency detector for receiving the changeable resonant frequency and the static resonant frequency. A difference between the changeable resonant frequency and the static resonant frequency is proportional to a change in the environmental condition.

The first resonant device is exposed to the environmental condition and the second resonant device comprises a protective coating. The first resonant device is fabricated over the second resonant device, the first resonant device and the second resonant device separated by a material layer.

According to an embodiment of the present invention, an electronic device comprises a substrate, and a feature comprising an output, wherein the feature is an accumulated material impinged on the substrate.

The feature is a sensing device among a plurality of sensing devices placed in range of a transmitter, wherein each of the plurality of sensing devices emits a unique predetermined resonant frequency in response to a signal of the transmitter. The electronic device further comprises a receiver in the range of the plurality of sensing devices, wherein the receiver individually interrogates each of the plurality of sensing devices according to the resonant frequency of each of the plurality of sensing devices. The feature is a resonant device impinged on the substrate having a predetermined natural frequency, the first resonant device having a changeable resonant frequency in response to an environmental condition, wherein the output is the resonant frequency.

The feature is a magnetic sensor for sensing a magnetic field of a current carrying conductor. The magnetic sensor has a nonlinear response to the magnetic field. The magnetic sensor comprises a coil around a permeable magnetic core, wherein the coil comprises two layers of impinged material formed on two sides of the permeable magnetic core, the two layers overlapping the magnetic core.

The feature is a temperature sensor for sensing a temperature of a current carrying conductor. The feature is a voltage sensor for sensing a voltage of a current carrying conductor.

The feature is functional as deposited.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Wireless sensors, and in particular wireless sensors for harsh environments, represent a growing and vital segment of the sensor application universe. According to an embodiment of the present invention, sensors fabricated by direct-write thermal spray techniques that can withstand the high-temperature, corrosive environments that more traditional sensors would not be able to tolerate for long durations. These sensors are embedded directly into functional thermal spray coatings for improved integration, longer life, and minimal disturbance to the functionality of the substrate component.

Figure 1:
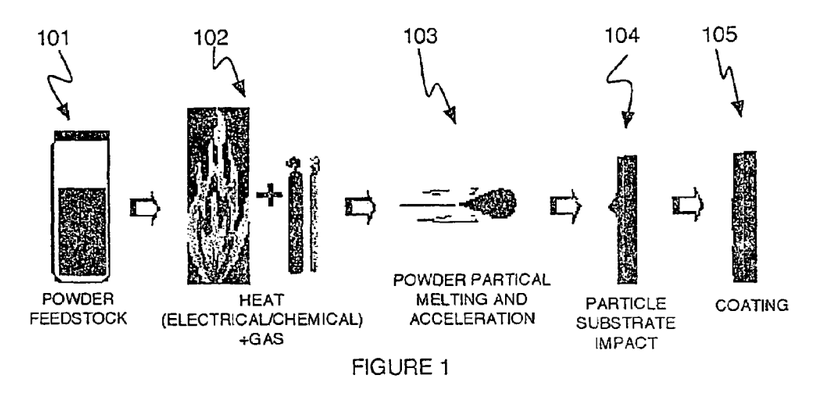
FIG. 1 is a flow chart of a thermal spray method.

Referring to FIG. 1, thermal spray is a directed spray process in which material is accelerated to high velocities and impinged upon a substrate, where a dense and strongly adhered deposit is built. Material 101 is injected in the form of, for example, a powder, wire, or rod, into a high velocity combustion or thermal plasma flame 102, which imparts thermal and kinetic energy to the particles 103. By controlling the plume characteristics and material state (e.g., molten, softened), it is possible to deposit a wide range of materials (e.g., metals, ceramics, polymers and combinations thereof) onto virtually any substrate in various conformal shapes. The ability to melt, rapidly solidify and consolidate introduces the possibility of the synthesizing useful deposits at or near ambient temperature. The deposit is built-up by successive impingement of droplets, which yield flattened, solidified platelets, and referred to as 'splats' 104. Alternatively, cold-spray processes similarly impinge material onto a substrate, but do so without the introduction of heat into the material stream. According to an embodiment of the present invention, thermal spray can be used for mesoscale (e.g., about 100 μm to 10 mm) structures, particularly for electronic applications. Thermal spray methods can be used to form thick (e.g., about greater than 20 μm), smooth deposits of a wide range of ceramics, including for example, alumina, spinel, zirconia, and barium titanate. Additionally, thin (e.g., about less than 200 μm wide) metallic lines of Ag, Cu, as well as Ni-based alloys, have been produced with square sides and that have electrical conductivities as good as, and in some cases superior to, conductor lines formed using traditional thin-film methods. Methods for spray production of coatings and direct-write lines (referred-to as direct-write thermal spray), can be comprised of any thermal spray techniques, including combustion, wire-arc, thermal plasmas and non-thermal, solid-state deposition, such as cold-spray.

The advantages of direct-write thermal spray for sensor fabrication include robust sensors integrated directly into coatings, thus providing improved coating performance monitoring, high-throughput manufacturing and high-speed direct-write capability, and useful materials electrical and mechanical properties in the as-deposited state. Other advantages include the cost effective nature, wherein the method is efficient and able to process in virtually any environment, robotics-capable implementations for difficult-to-access and severe environments, the methods can be applied on a wide range of substrates and conformal shapes, and the methods rapidly translatable development to manufacturing using existing infrastructure.

Thermal spray methods can produce blanket deposits of films and coatings 105 as shown in FIG. 1, as well as patches, lines and vias. Multilayered structures can be produced on plastic, metal, and ceramic substrates, both planar and conformal. Embedded functional electronics and sensors can be over coated with a protective coating, allowing applications in harsh environments. Such embedded harsh environment sensors can be used for condition-based maintenance of engineering components.

Sensors deposited by thermal spray can be interrogated using a passive (e.g., non-energy consuming) readout strategy. According to an embodiment of the present invention, sensors fabricated by thermal spray processes are designed to shift frequency, amplitude, phase, Q-factor, etc. in response to environmental conditions, including for example, temperature and emissions of other devices. The sensor parameters can be extracted according to changes in, for example, frequency, amplitude, phase, and Q-factor. Additional advantages of thermal spray techniques for fabricating sensors includes the ability to make multi-layer devices, to use a wide variety of materials, to fabricate devices onto conformal surfaces, and to fabricate sensors onto engineering components and pre-existing structures.

Figure 2A:
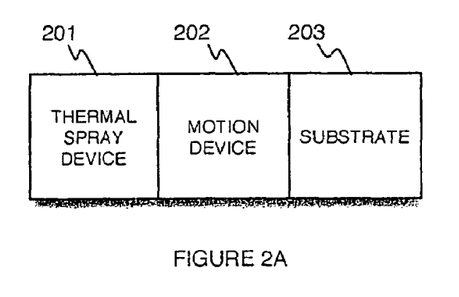
FIG. 2A is a diagram of a thermal spray system according to an embodiment of the present invention.
Figure 2B:
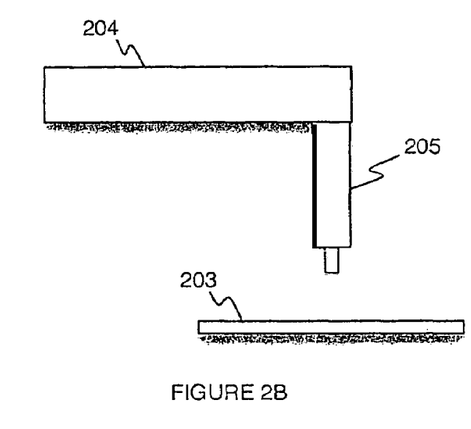
FIG. 2B is a diagram of a thermal spray system according to an embodiment of the present invention.

Referrring to FIG. 2A, a system for fabricating an electronic device comprises a thermal spray device 201 for depositing a material and a programmable motion device 202 supporting a thermal spray nozzle or a substrate 203 being written on. The programmable motion device 202 comprises a processor for receiving instructions and an articulated arm 204 supporting at least the thermal spray nozzle 205 or the substrate being written on as shown in FIG. 2B. The articulated arm 204 follows the instructions received by the processor to write a device pattern to the substrate.

It is to be understood that the system for fabricating an electronic device comprising a thermal spray device may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Direct-write thermal spray electronics technologies provide an opportunity to integrate mesoscopic electronic devices with a physical structure on which the electronic systems will be used, eliminating the need for a traditional printed wiring board substrate. A direct-write thermal spray system's ability to print electronic features on flexible substrates, e.g., fabrics, polymers, and brass, enables applications for deployable electronics, such as placing electronics in projectiles, for flexible satellite solar arrays, usage in rolled-up forms that can be inserted into symmetric or odd shapes, installed on military gear, as well as various surveillance equipment. Writing a device directly onto a component being monitored saves space and reduces weight through 3-D integration. Direct-write thermal spray provides a cost savings by reducing the number of discrete passive components in automated fabrication and minimizing procurement. Direct-write thermal spray reduces inventories of electronic components or parts. Specialty parts can be built on the "fly" without mass production set-up costs. Direct-write thermal spray also increases the reliability of rugged electronic components due to the automated assembly process and the absence of solder joints.

According to an embodiment of the present invention, electronic devices such as sensors and sensor systems are seamlessly integrated into the functional components. The devices are capable of withstanding harsh environments. For example, a sensor system is transparent to a system being interrogated, e.g., the sensor system does not disturb or alter the system being interrogated. A sensor that is directly embedded into the component, in a coordinated manner has an advantage in terms of reliability, longevity, and minimal disturbance of system function. Methods, designs, and processes have been developed to fabricate a variety of sensors for harsh environments. Referring to FIG. 3A to 3E, examples include inductors/transformers (FIG. 3A), thermistors (FIG. 3B), magnetic sensors (FIG. 3C), RF elements (FIG. 3D, and microheaters (FIG. 3E) (e.g., for integration into chemical and biological sensors). Further examples include strain gauges, thermocouples, thermopiles (e.g., thermocouples in series for power generation), piezo sensors, interdigitated capacitors for L-C circuits, and antennas. According to another embodiment of the present invention, sensor and electronic devices are prepared in-situ and in environmentally friendly "lean" manufacturing method.

Further, a suite of passive, wireless methodologies can be used to monitor sensor output. The sensors are fabricated using a direct-write thermal spray, and a wide variety of capabilities are possible.

Figure 4A:
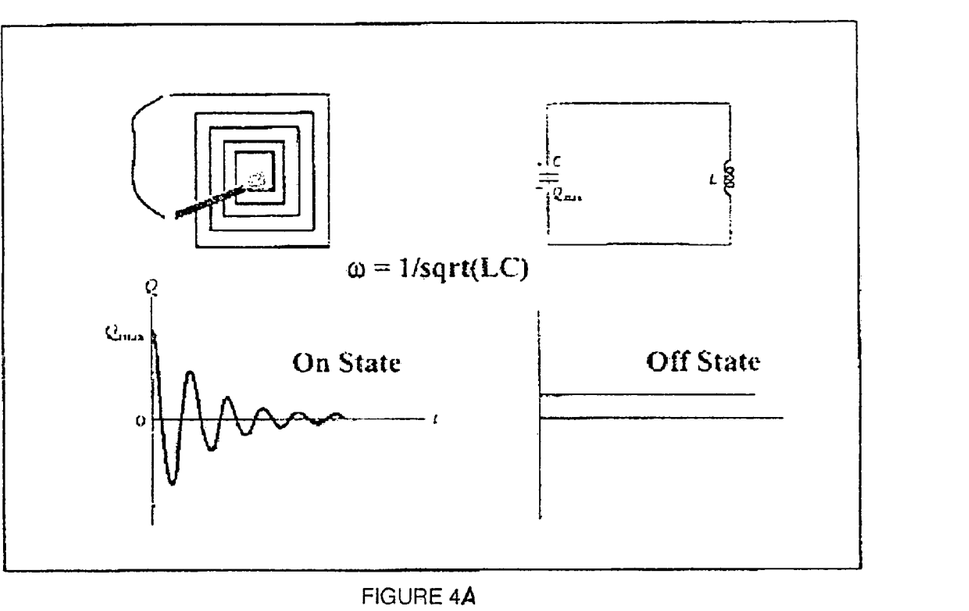
FIGS. 4A to 4D are a diagram of a passive wireless radio-frequency identification tag according to an embodiment of the present invention.

Remote sensing using radio-frequency (RF) tags as anti-theft devices is well known. According to an embodiment of the present invention, a passive radio-frequency (RF) tag is inductive-capacitive circuit (LC) as illustrated in FIG. 4A. When exposed to an appropriate radio frequency excitation, for example, a burst of white noise, the circuit oscillates at a resonance frequency, f, given by:

$$f = \frac{1}{2\pi(LC)^{\frac{1}{2}}}$$

Figure 5:
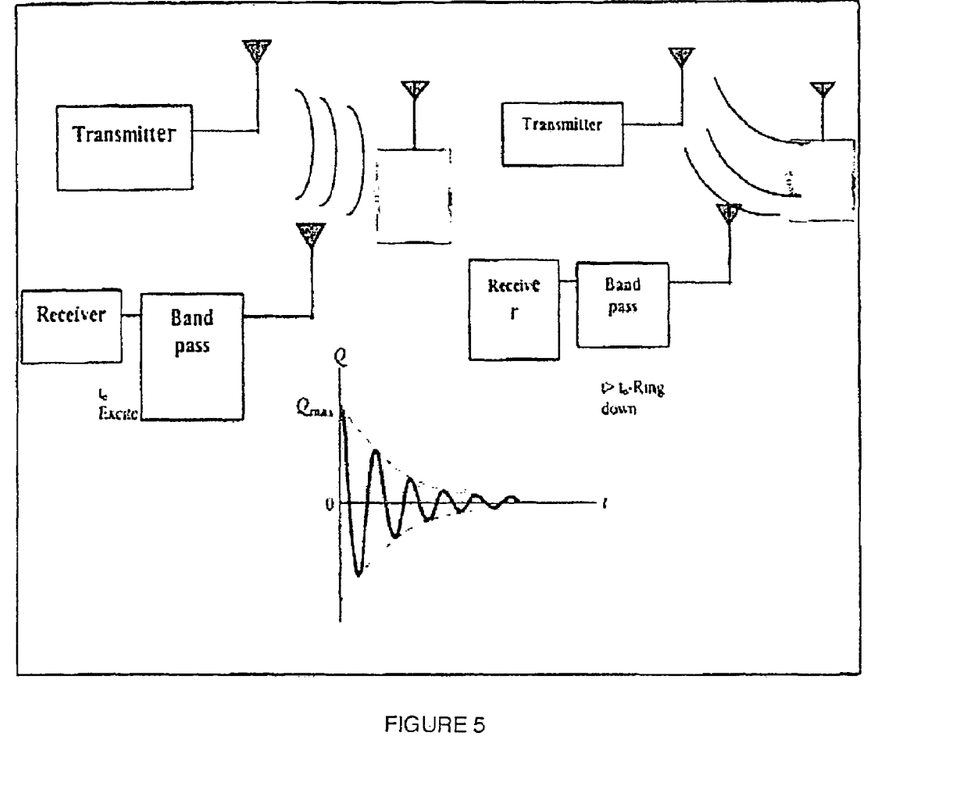
FIG. 5 is a diagram of a wireless sensor read-out system according to an embodiment of the present invention.

Even after the excitation is turned off the circuit will continue to oscillate as shown in FIG. 5. The time needed for the circuit to ring down depends on the Q of the circuit; the higher the Q the longer the time for the signal to decay. The higher the resistance of the circuit the lower the Q.

The readout of these sensors needs detection of the resonance frequency and the excitation (transmitted) RF signal may interfere with detection. The ring down period after the excitation is turned off is used to detect the resonance frequency of the device (FIG. 4A). Remote detection can be used even if it is not possible to make an electric connection to the device. For example, a humidity sensor can be placed inside of a sealed container and the integrity of the seal tested by determining the relative humidity by remote sensing. An RF transparent window into the container is provider to read the sensor.

Figure 4B:
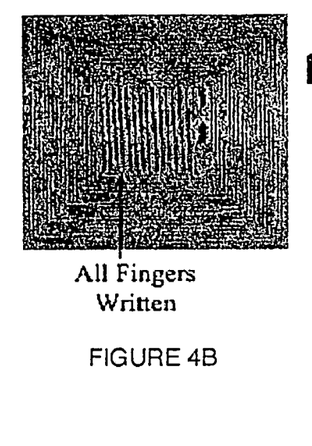
Figure 4C:
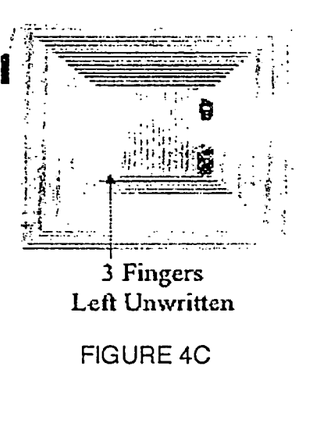
Figure 4D:
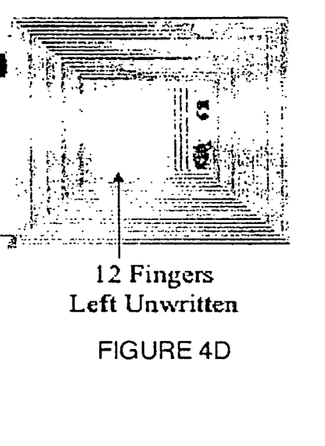
Figure 4E:
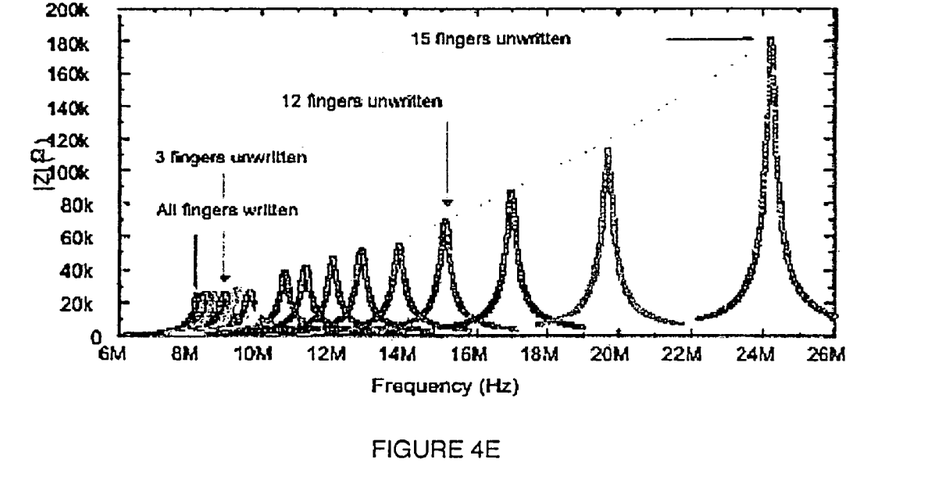
FIG. 4E is a graph of frequency responses according to the devices of FIG. 4B to 4D.

Uniquely resonant frequencies can be achieved according to a predetermined requirement. Using the multi-resonant tags, e.g., as shown in FIG. 4B to 4D, along with wireless sensors, multiple sensing capabilities are possible. Using a broadband sweeping technique, a RFID tag can be coupled to a host of sensors. When excited with a broadband signal sweep, the sensors will respond at their appropriate frequencies and can provide relevant information for unique identification and interrogation. FIG. 4E show frequency responses for the devices shown in FIG. 4B to 4D.

According to an embodiment of the present invention, differential detection can also be used with passive RF sensors. A number of similar LC devices are used: one has a capacitor that is sensitive to the parameter being measured, e.g., temperature or humidity and the other has a fixed capacitor with a fixed resonance frequency. The differential detection method can be used in continuous mode with a constant excitation in a frequency band encompassing the resonance frequency (FIG. 4A). The receiver used to detect the signal is tuned to a band encompassing the difference frequency. By determining the difference frequency, the value of the resonance frequency, $f_x$, of the sensor circuit can be determined. The value of the sensed parameter (humidity, temperature, etc.) can be calculated from $f_x$. Alternatively a calibration curve can be determined to establish the relationship between $f_{diff}$ and the sensed parameter.

Furthermore, thermal spray can be used to design and optimize the response of the sensor circuit, for example the frequency change, for a given change in the source to be sensed. The appropriate choice of, for example, component values, materials, geometry, overcoating, componet proximity, and thermal spray deposition parameters can be made to provide the optimum, for example the largest, frequency shift for a fixed change in the source.

Figure 9:
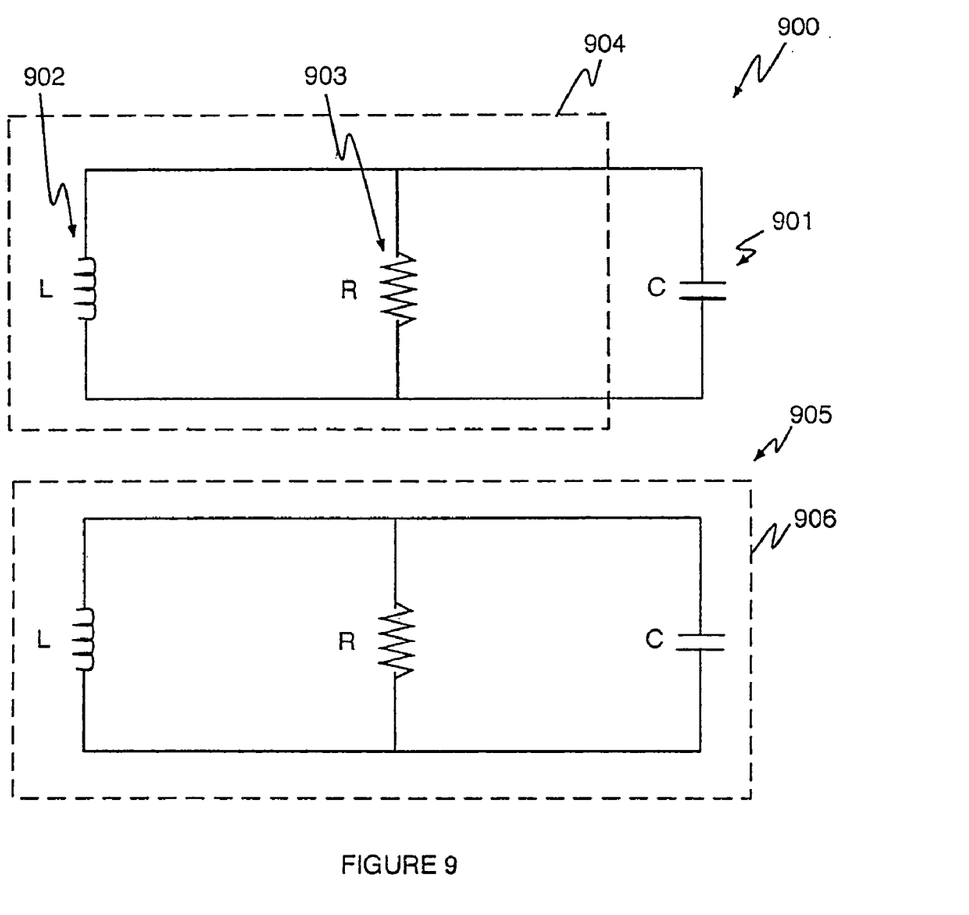
FIG. 9 is a diagram of a differential sensor according to an embodiment of the present invention.

Many sensors change resistance in response to a change in the measured variable of interest. Thermistors, magnetoresistive and piezoresistive sensors are examples. Also gas composition sensors using conductive oxides are of this type. The remote sensing of a change in resistance uses the change in the Q of the resonant circuit rather than a change in the resonant frequency. In the ring down period after a pulse excitation the decay will be faster if the resistance is higher. Differential detection can be used as shown in FIGS. 5 and 9. The capacitor in the sensor circuit will be fixed giving a fixed difference frequency. To measure the decay time the transmitter is operated in pulse mode with the receiver tuned to the difference frequency.

Micropower Impulse Radar (MIR) uses a system for measuring the time delay between a transmitted pulse and a reflected pulse. The method uses Pulse Frequency Modulation (PFM) and Amplitude Modulation (AM) (see Handbook of Modem Sensors, Jacob Fraden, Springer-Verlag, New York 1993, pp275-278). The system can be adapted to monitoring a large array of sensors each with a different resonance frequency within a fixed band.

Magnetic fields or currents can be sensed by the change in inductance of a coil with a permeable core. When the core is saturated the permeability decreases and the change in the inductance of the coil changes the resonance frequency. The response is nonlinear so this type of magnetic field sensor is best suited for on/off sensing, for example, remotely determining if there is current flowing in a high tension power line.

These and other devices can be made by direct-write thermal spray processing. The conductor lines, dielectrics, inductors and sensor materials can be prepared having properties suitable for high quality RF circuits.

According to an embodiment of the present invention, thermal spray technology is implemented for developing multilayer sensors for enhanced performance. The wireless RF concepts discussed above can be extended by fabricating several devices on top of one another. For example different LC sensor systems can be fabricated on top of previous devices by thermal spraying an insulating layer between devices. In this fashion, all devices would experience approximately the same sensing environment, however each sensor would report on the individual quantity that it is measuring.

Similarly, properties of fabricated components can be increased without significant increase in surface area needed for their fabrication. Inductance and capacitance values, for example, can be increased by fabricated several devices, for example parallel-plate capacitors, on top of each other. In this fashion a far wider array of electronic component values can be achieved with the same physical footprint.

According to an embodiment of the present invention, thermal spray technology can be deposited on a wide variety of material. Examples include a wide variety of metals, including refractory metals, semiconductor materials, ceramics, dielectric materials, plastics and polymers. This is in contrast to traditional electronics manufacturing techniques, which can be considerably limited in the types of materials that can be deposited. Only a small number of materials, for example, are compatible with most traditional microelectronics manufacturing. The unique material versatility of thermal spray provides the capability to produce sensors and electronics from a wide variety of material combinations, thus providing unique sensor and electronic capabilities. Examples include the ability to deposit refractory materials such as NiCr, tungsten, and molybdenum; semiconductors, such as silicon and germanium; and various ceramics. In addition interfaces for such materials, including semiconductor-metal, metal-metal, metal-dielectric junctions and interfaces, etc., can be fabricated with relative ease.

One of the capabilities of direct-write thermal spray is that sensors and electronic components can be fabricated on conformal, or non-flat surfaces. Since the deposition tool can move in three-dimensional space, it can follow the surface contour of a component, thus providing the unique capability to deposit material and fabricate sensors on complex geometries, for example, the inside or outside surfaces of automobile components, helmets, airplane components, etc.

Furthermore, surfaces that are constantly deforming, for example melting or solidifying materials, objects undergoing strain or thermal expansion, moving objects, for example, on a manufacturing line, are well suited for this technology, for the write process can be dynamically adjusted in real time to accommodate the time-varying geometry of the surface.

Direct-write thermal spray technology is very robust in its ability to deposit on existing structures. No clean room is needed for the deposition, while surface preparation needs before deposition are minimal to none. Deposition can be done in atmospheric conditions at ambient pressure, as contrasted to the very high vacuum and contaminant-free conditions needed in thin-film manufacturing, for example. Examples of pre-existing structures comprising, for example, brick, concrete, stone and other natural materials, wood, both painted and bare metal, trees and plants, plastics, etc., are compatible with the thermal spray direct-write process. Furthermore, the sensors and electronics are functional immediately after deposition. No high-temperature firing, annealing, or other post-processing is needed for these materials, which represents unique and significant advantage over many other processing techniques.

Thermal spray can provide functional coatings for wear, thermal and corrosion protection for a wide variety of engineering components, including turbines and internal combustion engine components, bridges and other severe-weather structures, medical and dental implants, etc. Direct-write thermal spray for sensor fabrication is self-compatible with traditional thermal spray processes. Functional sensors can be embedded directly onto engineering components and pre-existing structures that are subsequently overcoated with traditional thermal spray or other protective coatings. In this fashion, sensors and electronics can be integrated directly into functional thermal spray coatings to protect components. Since the sensors are integrated directly into the coatings, the deleterious effects associated with mechanical attachment of third-party sensors to components is minimized, while the sensor itself enjoys protection from the coating in which it is embedded, resulting in improved reliability of the sensor, and thus the component, reduced maintenance costs, longer sensor life, and improved sensor accuracy over its life cycle.

As an example circuit, a Si-based thermistor is connected in parallel with a coil and capacitor to produce a resonant RLC circuit whose resonant amplitude varies as the thermistor resistance changes. The thermistor material in this case was thermal-sprayed doped silicon. RLC sensor circuit was placed between two circular coils separated by approximately 50 cm. One coil is driven by a frequency generator, and the second is connected to a lock-in amplifier. The RLC sensor circuit is placed between the two coils, and the voltage at the receiving coil is monitored as a function of frequency, as a shown in the FIG. 6.

Figure 6:
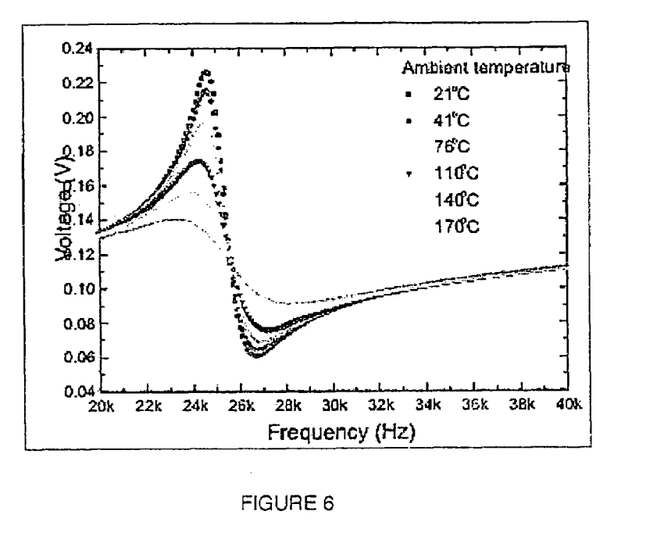
FIG. 6 is a graph of a voltage at a receiving coil as a function of frequency, according to an embodiment of the present invention.

Semiconductor thermistors exhibit increased resistance at higher temperatures, which tends to dampen the RLC circuit response, resulting in a lower, more broad response, as seen in the FIG. 6 and considering the two cases for temperatures of 21° C. (sharpest response) and 170° C. (least-defined response). These results demonstrate that resistance-based RLC sensors can be used to fabricate functional, wireless passive sensors.

Humidity can be sensed by using a resonant LC circuit. Using a dielectric material whose dielectric constant depends on humidity, for example, $Al_2O_3$ or $MgO-3Al_2O_3$, for the capacitor in an LC circuit results in a shift in the natural frequency of the circuit with changes in humidity. An example of such LC device fabricated using thermal spray technology is shown in FIG. 7.

Figure 7:
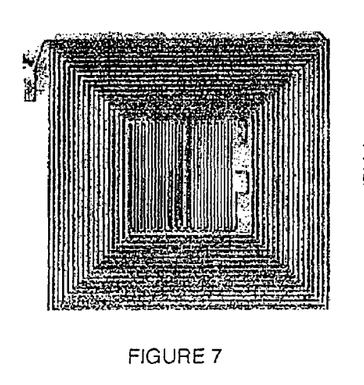
FIG. 7 is a diagram of an inductive-capacitive circuit according to an embodiment of the present invention.
Figure 8:
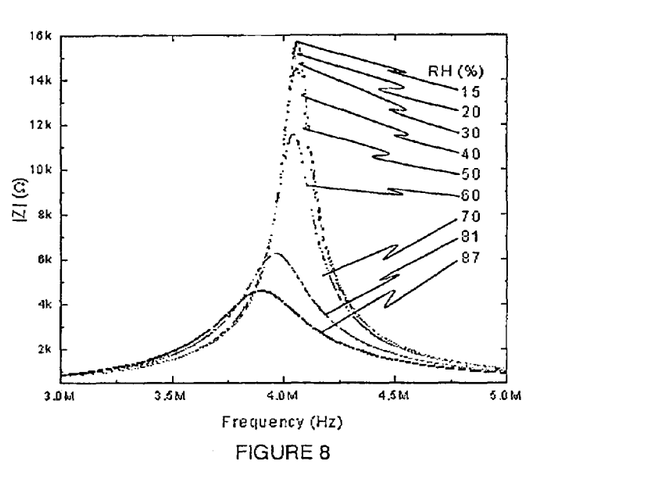
FIG. 8 is a graph of a response signal of the device shown in FIG. 7, according to an embodiment of the present invention.

The response of the LC circuit shown in FIG. 7 to varying humidity environments is shown in FIG. 8. As can be seen, humidity variations result in changes in both the peak amplitude and the "spread" or Q-factor of the circuit. The circuit thus performs as a wireless, passive RF circuit for monitoring humidity.

According to an embodiment of the present invention, a differential sensor comprises an exposed sensing element and a protected sensing element. Referring to FIG. 9 one or more components, e.g., resistor, inductor, or capacitor, are exposed to a source to be sensed. As shown in FIG. 9, a capacitor 901 of a first sensor 900 is exposed. The inductor 902 and resistor 903 are protected by a coating 904. A second device 905 is provided. The second device has a known characteristic. The second device may have the same layout as the first device. The second device is protected by a coating 906, such that the known characteristic does not change. Therefore, a difference between the first device 900 and the second device 905 can be determined. The deference corresponds to a condition of the source being sensed.

Figure 10:
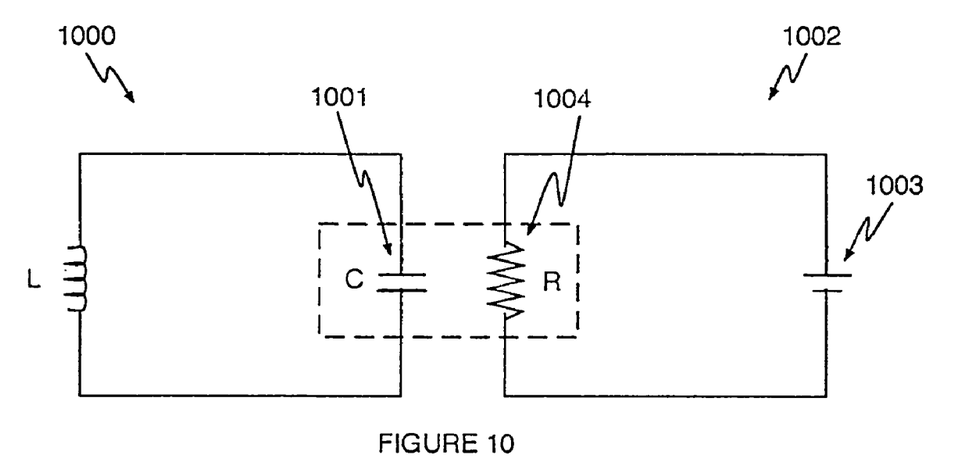
FIG. 10 is a diagram of a temperature-based passive wireless sensor circuit according to an embodiment of the present invention.

Referring to FIG. 10, a temperature-based passive wireless sensor circuit can be built using thermal spray. The temperature-based passive wireless sensor circuit comprises a first circuit 1000 including a temperature-dependent capacitor 1001. A second circuit 1002 is thermally coupled to the first circuit 1000. The second circuit 1002 comprises a voltage-producing sensor 1003, such as a thermocouple, thermopile, piezoelectric sensor, or a magnetic sensor. The voltage-producing sensor 1003 generates $I^2R$ heating in resistor 1004, which is affected by the temperature-dependent capacitor 1001. Change in a capacitance value results in a shift in a resonant frequency of the first circuit 1000. The shift can be detected with a receiver in proportion to a change in the source to be sensed.

Figure 11:
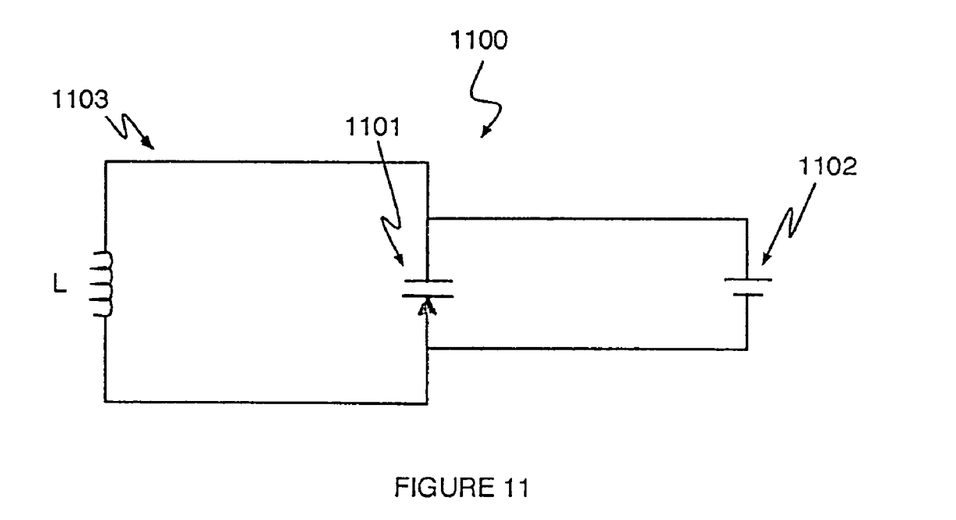
FIG. 11 is a diagram of a varactor-based passive wireless sensor circuit according to an embodiment of the present invention.

Yet another example of a device fabricated by thermal spray according to an embodiment of the present invention is shown in FIG. 11 as a varactor-based passive wireless sensor circuit 1100. The sensor circuit 1100 comprises a varactor 1101 and a voltage-producing sensor 1102, e.g., a thermocouple, thermopile, piezoelectric sensor, or magnetic sensor. The voltage-producing sensor 1102 changes capcitance or the varactor 1101. A change in the capacitance of the varactor 1101 results in a shift in a resonant frequency of the LC circuit 1103. The shift in the resonant frequency can be detected with a receiver where the shift is proportional to a change in a condition of a source being sensed.

Figure 3A:
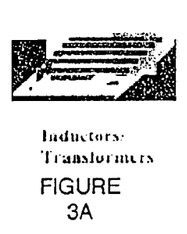
FIGS. 3A-E are diagram of exemplary devices according to an embodiment of the present invention.
Figure 3B:
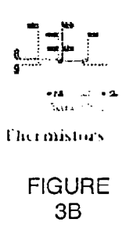
Figure 3C:
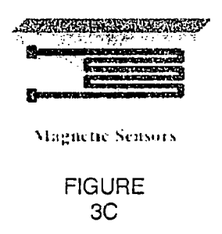
Figure 3D:
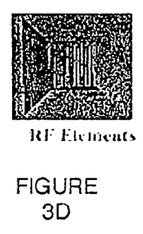
Figure 3E:
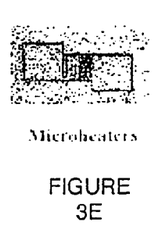
Figure 12A:
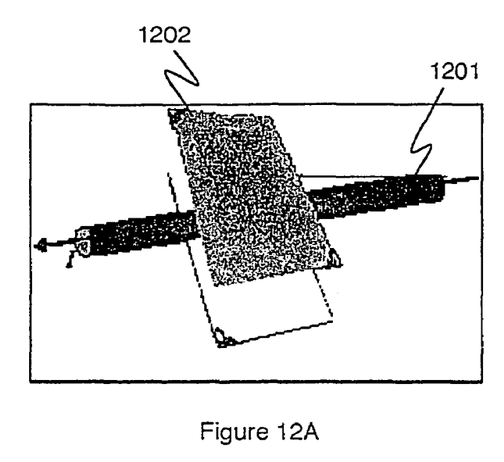
FIG. 12A is a diagram a response signal of a wireless magnetic-based current sensor according to the embodiment of the present invention.
Figure 12B:
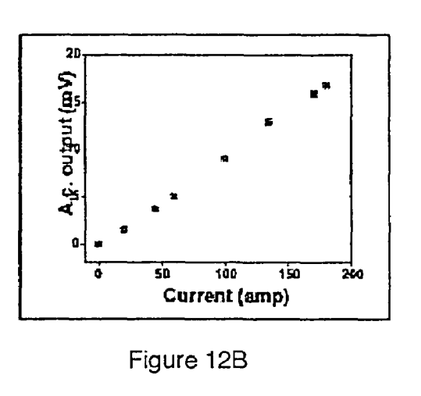
FIG. 12B is a graph of a response signal of a wireless magnetic-based current sensor according to the embodiment of the present invention.

Referring now to FIG. 12A and 12B, a magnetic sensor as shown in FIG. 3C can sense of a current carrying conductor. The current carrying conductor 1201 produces a magnetic field perpendicular to the current direction, I. The intensity of magnetic field is proportional to the current. Magnetic fields or currents can be sensed by the change in inductance of a coil 1202 with a permeable magnetic core, which is placed close to the current carrying conductor. Initial magnetic induction of the core is linear to the magnetic field and hence is expected to exhibit a linear response with the conductor current. Using a calibration of the inductor output, current can be measured directly. A second type of sensor can be developed for this setup. In this design, when the core is saturated the permeability decreases drastically and the inductance of the coil changes accordingly. This response is nonlinear so this type of magnetic field sensor is best suited for on/off sensing, for example, remotely determining if there is current flowing in a high tension power line. Furthermore, several sensors can be combined to monitor several parameters of a device or component. For example, temperature, current, and voltage sensors can be combined to simultaneously monitor temperature, current, and voltage, respectively, on a high tension power line. Each sensor would have its own unique resonant frequency in this case.

The inductor sensor has a coil around a permeable magnetic core. The coil was made by direct-write process whereas the magnetic core was deposited by traditional thermal spray methods. A schematic of an inductive current sensor is shown in FIG. 12A. Two inductive sensors are placed close to the current carrying conductor. The sensors were connected in series so that the output voltage of the sensors is added and it can be measured as a function of conductor current. The current was varied from about 0 to 200 Amps using an A.C. current source. The preliminary results of inductive current sensor are shown in FIG. 12B. One can observe a linear response between the sensor output and the current and it demonstrates the application of an inductive device as a current sensor.

Having described embodiments for a wireless sensor fabricated by thermal spray technology, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. An electronic device comprising:
   a substrate; and
   a feature comprising a passive wireless transmitter, wherein the feature is an accumulated material impinged on the substrate, wherein the feature is a magnetic sensor for sensing a magnetic field of a current carrying conductor, and wherein the magnetic sensor comprises a coil around a permeable magnetic core, wherein the coil comprises two layers of impinged material formed on two sides of the permeable magnetic core, the two layers overlapping the magnetic core.

2. The electronic device of claim 1, wherein the magnetic sensor has one of a linear response to the magnetic field and a nonlinear response to the magnetic field.

3. The electronic device of claim 1, wherein the feature is functional as deposited.

* * * * *

UNITED STATES PATENT AND TRADEMARK OFFICE
CERTIFICATE OF CORRECTION

PATENT NO. : 7,477,050 B2 Page 1 of 1
APPLICATION NO. : 10/491689
DATED : January 13, 2009
INVENTOR(S) : Richard Gambino et al.

It is certified that error appears in the above-identified patent and that said Letters Patent is hereby corrected as shown below:

Please delete the Statement Regarding Federally Sponsored Research or Development appearing at col. 1, lines 6-11 of the patent and replace as follows:

This invention was made with government support under grant no. N00014-00-1-0654, awarded by the Office of Naval Research. The government has certain rights in the invention.

Signed and Sealed this

Thirty-first Day of March, 2009

JOHN DOLL
*Acting Director of the United States Patent and Trademark Office*